United States Patent [19]

Okamoto et al.

[11] Patent Number: 4,830,749
[45] Date of Patent: May 16, 1989

[54] LIQUID WASTE FILTERING APPARATUS

[75] Inventors: Magoji Okamoto, Nagoya; Akimitsu Hiraki, Chita, both of Japan

[73] Assignee: NGK Insulators, Ltd., Japan

[21] Appl. No.: 69,020

[22] Filed: Jul. 1, 1987

[30] Foreign Application Priority Data

Jul. 15, 1986 [JP] Japan ............................... 61-164708
Jul. 15, 1986 [JP] Japan ............................... 61-164709
Jul. 15, 1986 [JP] Japan ............................... 61-164710

[51] Int. Cl.$^4$ .......................................... B01D 29/10
[52] U.S. Cl. .................................. 210/323.2; 55/484;
55/523; 210/457; 210/477; 210/496; 210/497.01; 210/510.1
[58] Field of Search ......... 55/483, 484, 523, DIG. 30; 210/247, 323.2, 457, 477, 488, 496, 497.01, 497.2, 510.1; 422/171, 180

[56] References Cited

U.S. PATENT DOCUMENTS

| | | | |
|---|---|---|---|
| 4,343,631 | 8/1982 | Ciliberti | 55/523 X |
| 4,417,908 | 11/1983 | Pitcher, Jr. | 210/510.1 X |
| 4,427,423 | 1/1984 | Montierth | 55/523 X |
| 4,625,511 | 12/1986 | Scheitlin et al. | 55/484 X |

FOREIGN PATENT DOCUMENTS 56-148607 11/1981 Japan .
787870 12/1957 United Kingdom ............. 210/510.1

*Primary Examiner*—W. Gary Jones
*Attorney, Agent, or Firm*—Arnold, White & Durkee

[57] ABSTRACT

A filter apparatus comprises a plurality of ceramic porous filter elements each having a number of through-apertures in parallel with each other whose front and rear ends are alternately closed, filter element casings arranging therein one of the filter elements, respectively, and piled one above the other with the filter elements received therein being spaced apart from each other and the front ends of the filter elements upward directing, raw liquid supply means for supplying a raw liquid to be filtered to the front ends of the filter elements, raw liquid supply chambers located between the filter elements for receiving the raw liquid from the raw liquid supply means, filtrate exhaust chambers located between the filter elements for receiving filtrate which has passed through the filter elements, and filtrate exhaust means for exhausting the filtrate from the filtrate exhaust chambers out of the apparatus. With this arrangement, raw liquid passages and filtrate passages are completely separated, so that no mixture of the raw liquid and the filtrate occurs, and therefore filtering and purifying of the raw liquid can be effected with high efficiency in high reliability.

10 Claims, 10 Drawing Sheets

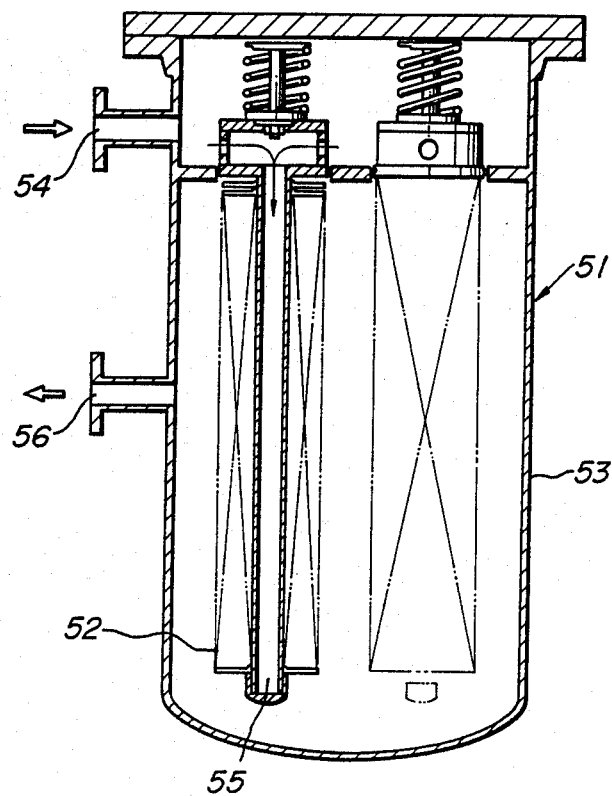
FIG_1
PRIOR ART

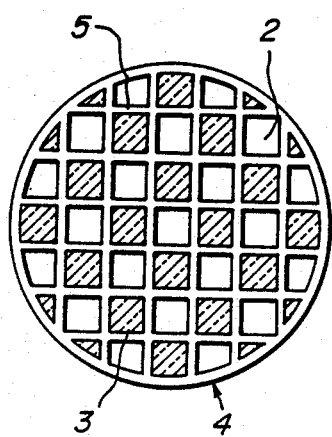
FIG_2a
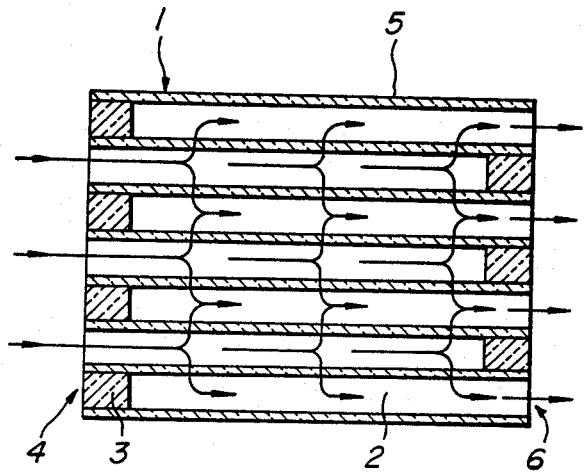
FIG_2b
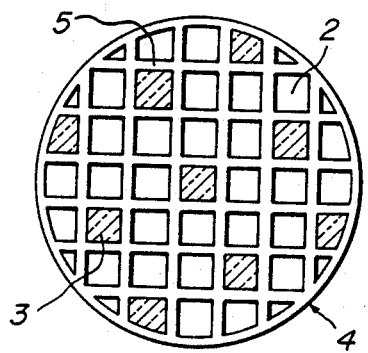
FIG_2c

FIG_3
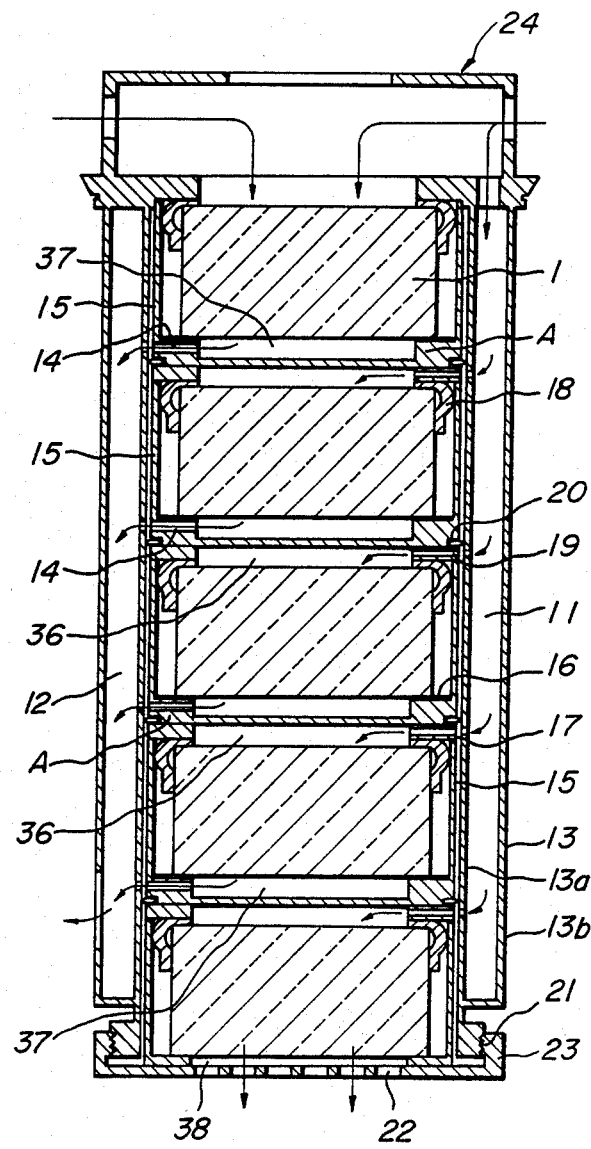

FIG_4
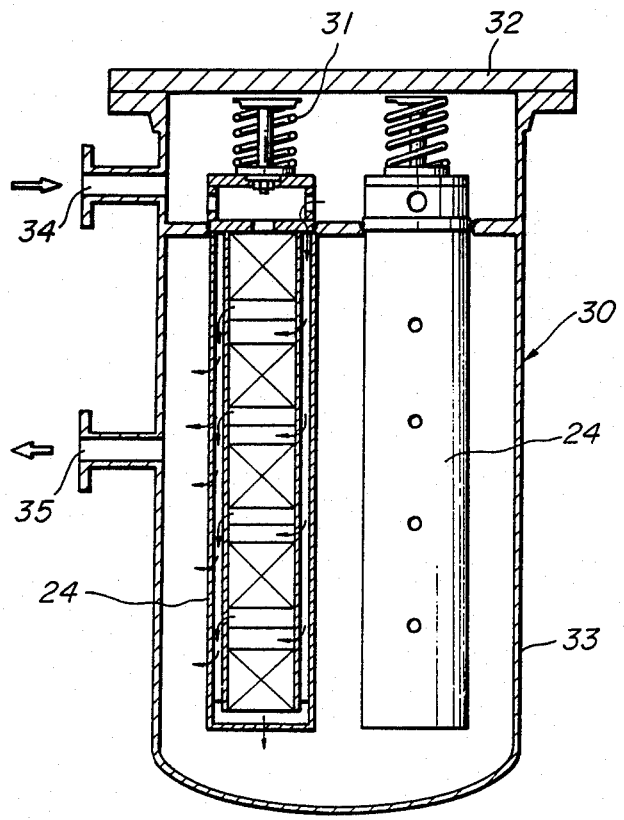

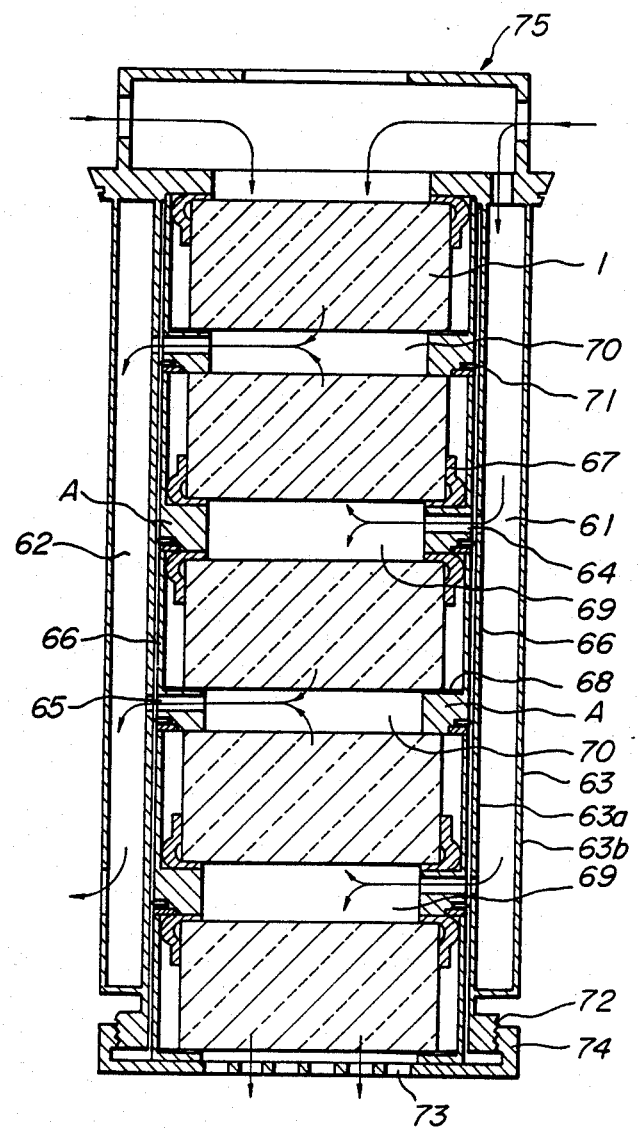
FIG_5

FIG_6
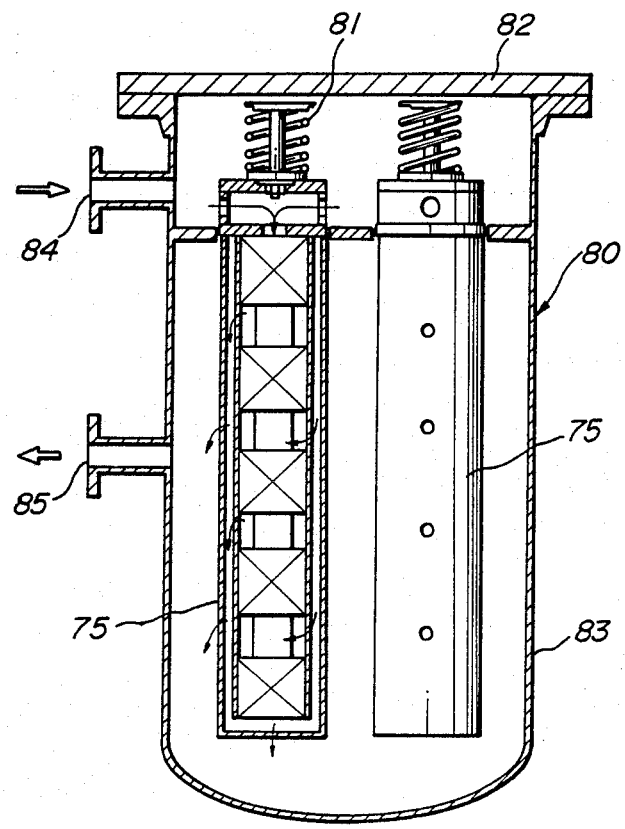

FIG_7a
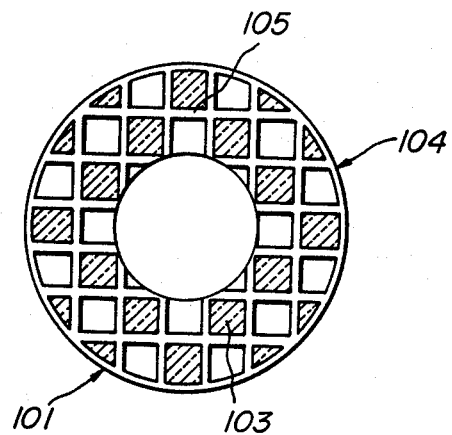
FIG_7b
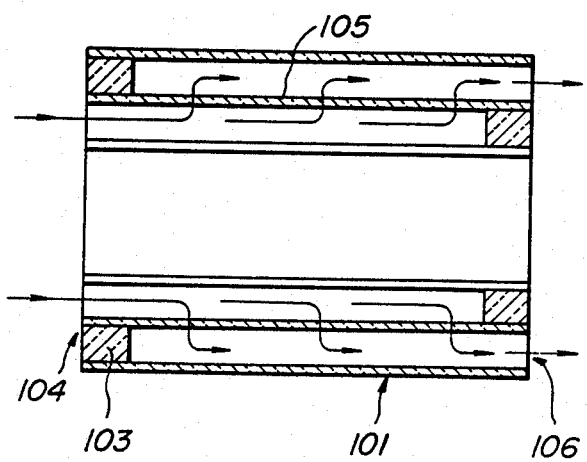
FIG_7c
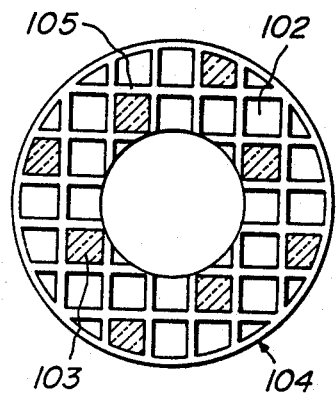

FIG_8
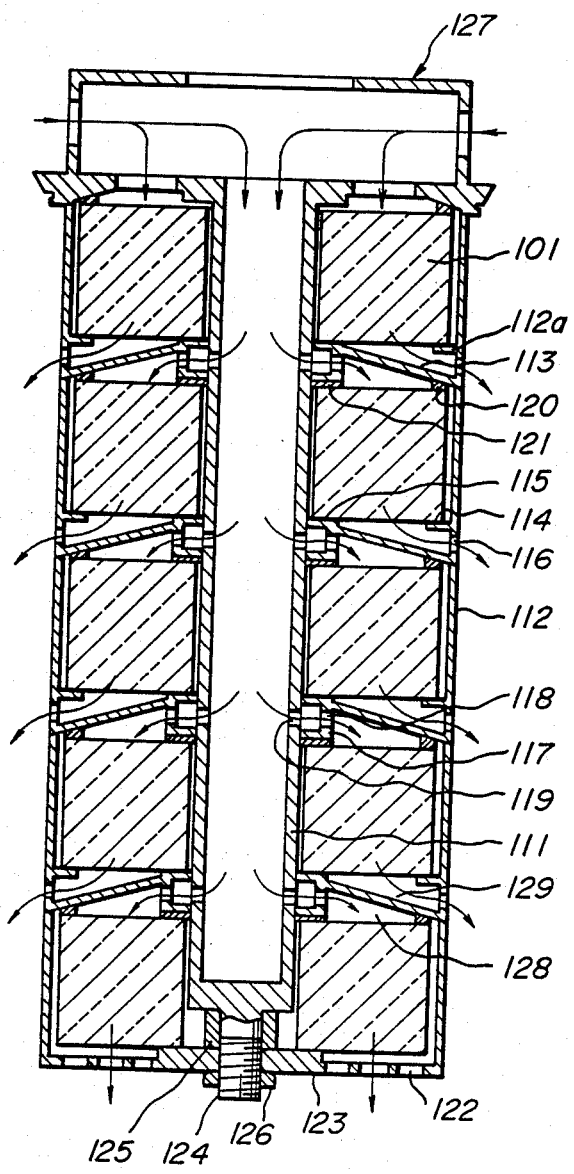

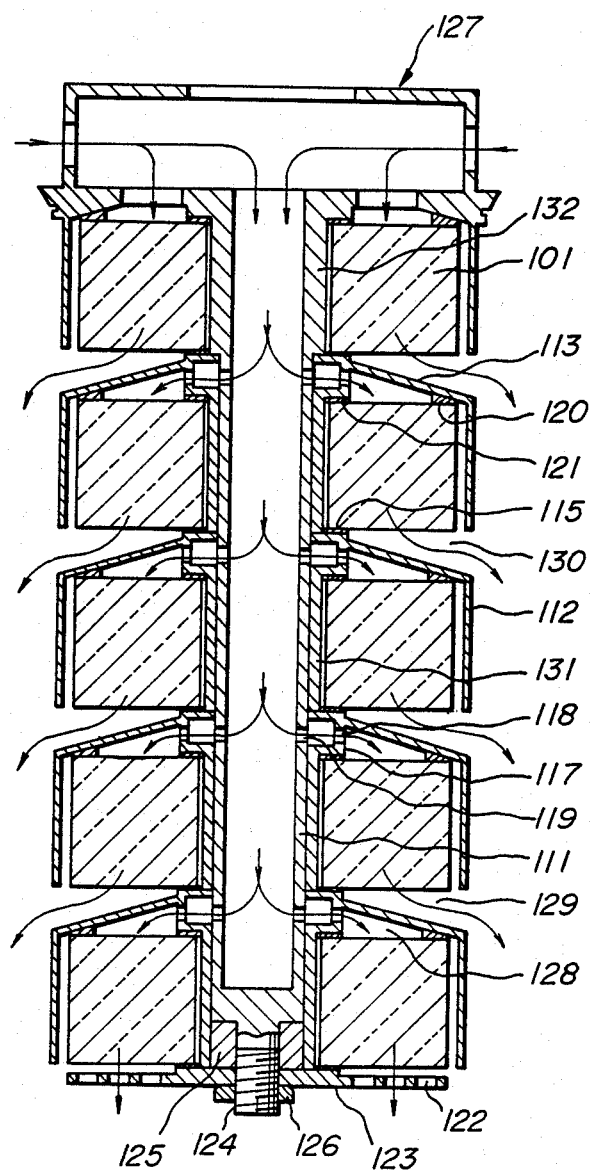
FIG_9

FIG_10
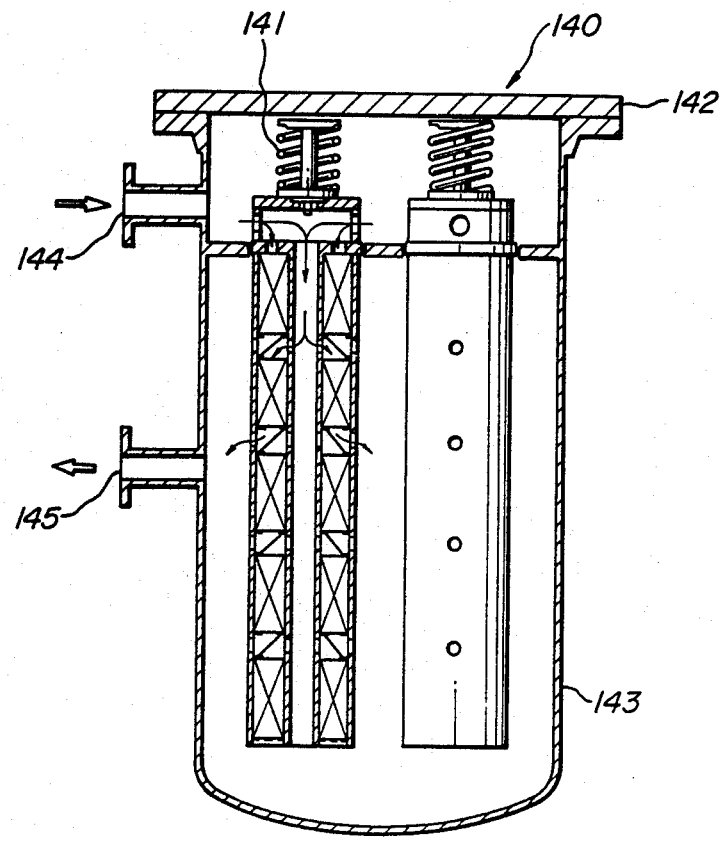

LIQUID WASTE FILTERING APPARATUS

BACKGROUND OF THE INVENTION

This invention relates to a filter apparatus using a plurality of ceramic porous filter elements, and more particularly to a filter apparatus useful for purifying water including suspended materials which were contaminated by radioactivity generated in nuclear power plants.

Component members (channel boxes, control rods and the like) used in reactors of nuclear power plants have been stored in pools filled with water. In this case, transparency of the water filled in the pools is needed in operation when the irradiated metal waste contaminated by radioactivity are immersed in the pools. In general, part of the water in the pool is always filtered and purified by a filter apparatus including sintered metal filter units.

Referring to FIG. 1, a hitherto used purification filter unit 51 includes four cylindrical sintered metal filters 52 and a filter casing 53 enclosing these filters 52. The water in the pool is supplied into an upper inlet 54 of the filter casing 53 and flows through upper portions and center passages 55 of the respective sintered metal filters 52. The water is filtered and purified during the flowing from the interior to exterior of the filters 52 and is exhausted from an outlet 56.

However, the hitherto used filter apparatus including the sintered metal filters as above described is expensive to manufacture and has a short use life. In addition, this filter apparatus is complicated in construction and heavy and has only small filtering areas. In order to eliminate any of these disadvantages, a filtering apparatus using porous ceramic bodies has been proposed in, for example, Japanese Laid-open Patent Application No. 56-148,607. In this case, however, as the porous ceramic body consists of a fired material or pottery, it is only possible to manufacture small filters, and filters having wide filtering surfaces could not be produced.

SUMMARY OF THE INVENTION

It is a principal object of the invention to provide a filter apparatus which eliminates all the disadvantages of the prior art described above and which is inexpensive to manufacture capable of a prolonged life span and is of a relatively light weight.

In order to achieve this object, a filter apparatus according to the invention comprises a plurality of ceramic porous filter elements each having a number of through-apertures in parallel with each other whose front and rear ends are alternately closed, filter element casings arranging therein one of the filter elements, respectively, and piled one above the other with the filter elements received therein being spaced apart from each other and said front ends of the filter elements facing upwards, raw liquid supply means for supplying a raw liquid to be filtered to the front ends of the filter elements, raw liquid supply chambers located between said filter elements for receiving said raw liquid from said raw liquid supply means, filtrate exhaust chambers located between said filter elements for receiving filtrate which has passed through the filter elements, and filtrate exhaust means for exhausting said filtrate from said filtrate exhaust chambers out of the apparatus.

With the above arrangement of the filter apparatus according to the invention, the raw liquid to be filtered flows through one of the ceramic porous filter elements piled in multiple stages, during which the raw liquid is filtered and purified. The filtrate is exhausted through the filtrate passages provided separately from the raw liquid passages out of the apparatus. In this case, the raw liquid passages and the filtrate passages are completely separated, so that no mixture of the raw liquid and the filtrate occurs, and therefore filtering and purifying of the raw liquid can be effected with a high reliability.

Moreover, as the ceramic porous filter elements which are inexpensive and light weight in comparison with the sintered metal filters are used, the filter apparatus according to the invention is also inexpensive and light weight. Furthermore, as a plurality of the ceramic porous filter elements are piled in parallel to form the filter apparatus according to the invention, the filtering areas can be greatly increased.

In order that the invention may be more clearly understood, preferred embodiments will be described, by way of example, with reference to the accompanying drawings.

BRIEF DESCRIPTION OF THE DRAWINGS

FIG. 1 is a schematic sectional view illustrating one example of a filter unit of the prior art;

FIG. 2a is a side view schematically illustrating one embodiment of an entry side of a ceramic porous filter element to be used in the filter apparatus according to the invention;

FIG. 2b is a longitudinal sectional view of the ceramic porous filter element shown in FIG. 2a;

FIG. 2c is a side view schematically illustrating another embodiment of an entry side of a ceramic porous filter element according to the invention.

FIG. 3 is a schematic sectional view illustrating one embodiment of the filter apparatus according to the invention;

FIG. 4 is a schematic view illustrating one embodiment of an actual filter unit using the filter apparatuses according to the invention;

FIG. 5 is a sectional view illustrating another embodiment of the filter apparatus according to the invention;

FIG. 6 is a schematic view illustrating another embodiment of the actual filter unit using the filter apparatuses according to the invention;

FIG. 7a is a side view schematically illustrating a further embodiment of an entry side of a ceramic porous filter element to be used in the filter apparatus according to the invention;

FIG. 7b is a longitudinal sectional view of the ceramic porous filter element shown in FIG. 7a;

FIG. 7c is a side view schematically illustrating a further embodiment of the filter element;

FIG. 8 is a sectional view illustrating one embodiment of the filter apparatus according to the invention using the filter elements shown in FIG. 7a;

FIG. 9 is a sectional view illustrating another embodiment of the filter apparatus according to the invention using the filter elements shown in FIG. 7a; and FIG. 10 is a schematic view illustrating one embodiment of the actual filter unit using the filter apparatuses shown in FIGS. 8 or 9.

DESCRIPTION OF THE PREFERRED EMBODIMENTS

First, the ceramic porous filter element for use in the present invention will be explained by referring to FIGS. 2a, 2b and 2c schematically illustrating examples of the filter elements in end views on an inlet side and a longitudinal sectional view.

Referring to FIGS. 2a and 2b, the ceramic porous filter element 1 is made of alumina, mullite, silica, cordierite or the like and has a number of through-apertures 2 in parallel with each other. Every other through-aperture 2 are closed at front and rear ends by ceramic sealing materials 3 as shown in FIG. 2a. As a result, when a raw liquid is supplied at one end 4 of the filter element on an inlet side into the filter element as shown by arrows in FIG. 2b, the liquid is filtered through ceramic porous partition walls 5 and then the filtered liquid or filtrate leaves the other end 6 through opened apertures on an outlet side.

FIG. 2c illustrates another ceramic filter element wherein a front end of one through-aperture and rear ends of the through-apertures around the one through-aperture are regularly alternately closed. The function of this filter element is substantially the same as that above described.

FIG. 3 illustrates one embodiment of the filter apparatus 24 according to the invention in longitudinal section. In this embodiment, five ceramic porous filter elements 1 are arranged in an inner cylinder 13a settled in an outer cylinder 13b to form a double casing 13 preferably made of a metal and simultaneously forming a raw liquid passage 11 and a filtrate passage 12 on both sides. These passages longitudinally divide a space between the inner and outer cylinders 13a and 13b into two equal spaces. In arranging the filter elements 1 in the double casing 13, each of the filter elements 1 is located through a protective packing 16 in a filter element casing 15 having at its bottom a stepped portion A and on its side filtrate exhaust openings 14 communicating with the filtrate passage 12. These filter element casings 15 are piled with packings 18 therebetween each consisting of a spacer 17 and an elastic member. There are provided raw liquid supply openings 19 on one side of the spacer, which communicate with the raw liquid passage 11. It is preferable in this case to provide a raw liquid supply chamber 36 communicating with the raw liquid passage 11 at an upper portion of each the ceramic filter element 1, and a filtrate exhaust chamber 37 in the filter element casing 15 below the ceramic filter element 1. Only a filtrate exhaust chamber 38 formed in the stepped portion A of the lowermost filter element casing 15 is directly connected to the exterior of the filter apparatus 24. Moreover, O-rings 20 are interposed respectively between the spacers 17 and bottoms of the filter element casing 15 to seal between the inner cylinder of the double casing 13 and the filter element casings 15. The double casing 13 is formed at its lower outer circumference with screw threads 21 engaging a filter retainer cover 23, thereby fixing the five ceramic porous filter elements 1 in the double casing to complete the filter apparatus 24 according to the invention.

With the filter apparatus 24 constructed as above described according to the invention, the raw liquid to be filtered flows along flowing passages shown by arrows in FIG. 3. In other words, the part of the raw liquid is supplied through an upper end of the apparatus into the uppermost ceramic porous filter element 1 and into the raw liquid supply chamber 36 above each ceramic porous filter element 1 through the raw liquid passage 11 and each the raw liquid supply opening 19. The filtrate which has been filtered through each the ceramic porous filter element 1 flows from the filtrate exhaust chamber 37 through the filtrate exhaust opening 14 and the filtrate passage 12 directly to the exterior of the filter apparatus. The filtrate which has been filtered through the lowermost ceramic porous filter element 1 is exhausted from the filtrate exhaust opening 38 through the apertures 22 into the exterior of the filter apparatus.

FIG. 4 schematically illustrates one embodiment of the actual filter unit 30 using the filter apparatus 24 according to the invention. As shown in FIG. 4, the four filter apparatuses 24 are fixed to a unit cover 32 by means of unit retainer springs 31 and covered by a filter casing 33 to complete the filter unit 30. When a raw liquid is supplied into an inlet 34 of the filter unit 30, the filtrate is exhausted through an outlet 35 of the unit.

FIG. 5 illustrates another embodiment of the filter apparatus 75 according to the invention in longitudinal section. In this embodiment, five ceramic porous filter elements 1 are arranged in an inner cylinder 63a settled in an outer cylinder 63b to form a double casing 63 and a raw liquid passage 61 and a filtrate passage 62, these passages dividing a space between the inner and outer cylinders 63a and 63b into two equal spaces. In arranging the filter elements 1 in the double casing 63, each filter element 1 is located through a sealing packing 67 or protective packing 68 in a filter element casing 66 having at its bottom a stepped portion A and on its side a raw liquid supply opening 64 or filtrate exhaust opening 65 communicating with the raw liquid passage 61 or filtrate passage 62. These filter element casings 66 are piled with packings 68 or sealing packings 67 therebetween. The filter element casing 66 is preferably made of a metal and the sealing packing 67 and the protective packing 68 are preferably made of an elastomer such as rubber. As above described, the respective ceramic porous filter elements 1 are piled to alternately form therebetween raw liquid supply chambers 69 communicating with the raw liquid supply openings 64 and filtrate exhaust chambers 70 communicating with the filtrate exhaust openings 65. Only the filtrate passing through the lowermost accommodating casing 66 is exhausted out of the filter apparatus directly, without passing through any filtrate exhaust openings. Moreover, O-rings 71 are located respectively at bottoms of the filter element casings 66 to seal between the inner cylinder of the double casing 63 and the filter element casing 66. The double casing 63 is formed at its lower outer circumference with screw threads 72 engaging a filter retainer cover 74, thereby fixing the five ceramic porous filter elements 1 in the double casing to complete the filter apparatus 75 according to the invention.

With the filter apparatus 75 constructed as above described according to the invention, the raw liquid to be filtered flows along flowing passages shown by arrows in FIG. 5. In other words, the part of the raw liquid is supplied through an upper end of the apparatus into the uppermost ceramic porous filter element 1 and into the raw liquid supply chamber 69 through the raw liquid passage 61 and each raw liquid supply opening 64. The filtrate which has been filtered through each ceramic porous filter element 1 is supplied into the filtrate exhaust chamber 70 and is exhausted out of the filter apparatus through the filtrate exhaust opening 65 and the filtrate passage 62. The filtrate which has been filtered through the lowermost ceramic porous filter element 1 is directly exhausted through the apertures 73 into the exterior of the filter apparatus.

FIG. 6 schematically illustrates one embodiment of the actual filter unit 80 using the filter apparatus 75 according to the invention. As shown in FIG. 6, the four filter apparatuses 75 are fixed to a unit cover 82 by means of unit retainer springs 81 and covered by a filter casing 83 to complete the filter unit 80. When a raw liquid is supplied into an inlet 84 of the filter unit 80, the filtrate is exhausted through an outlet 85 of the unit.

A further embodiment of the invention using ceramic porous filter elements different from those shown in FIGS. 2a-2c. FIGS. 7a, 7b and 7c schematically illustrate such doughnut type ceramic porous filter elements in end views on an inlet side and a longitudinal sectional view.

Referring to FIGS. 7a and 7b, the doughnut type ceramic porous filter element 101 is made of alumina, mullite, silica, cordierite or the like and has a number of through-apertures 102 in parallel with each other. Every other through-aperture 102 is are closed at front and rear ends by ceramic sealing materials 103 as shown in FIG. 7a. As a result, when a raw liquid is supplied at one end 104 of the filter element on an inlet side into the filter element as shown by arrows in FIG. 7b, the liquid is filtered through ceramic porous partitions 105 and then the filtered liquid leaves the other end 106 through opened apertures on an outlet side.

FIG. 7c illustrates another doughnut type ceramic filter element wherein a front end of one through-aperture and a rear end of through-apertures around the one through-aperture are regularly alternately closed. The function of this filter element is substantially the same as that above described.

FIG. 8 illustrates one embodiment of the filter apparatus 127 using the doughnut type filter elements according to the invention in longitudinal section. In this embodiment, five doughnut type ceramic porous filter elements 101 are connected together as a unitary body by means of a fluid guide tube 111 fitted in center apertures or cavities of the filter elements 101. Each doughnut type ceramic porous filter element 101 is fixed to a filter element casing 112 by means of a step portion 112a of the filter element casing 112 and an upper end of an inclined partition plate 113 formed integrally with the filter element casing 112 through outer and inner circumferential protective packings 114 and 115. The filter element casing 112 is provided below the step portion 112a with a plurality of filtrate exhaust openings 116, and at a location where the inclined partition plate 113 is in contact with fluid guide tube 111, with a step portion 117 at the same level as the lowermost end of the inclined partition plate 113. The step portion 117 is provided with a plurality of raw liquid supply openings 118 in opposition to a plurality of apertures 119 formed in the fluid guide tube 111. The openings 118 and apertures 119 form raw liquid passages. Filtrate exhaust chambers 129 communicating with the filtrate exhaust openings 116 and raw liquid supply chambers 128 communicating with the raw liquid supply openings 118 are formed in this manner. In assembling the plurality of filter element casings 112 accommodating the doughnut type ceramic porous filter elements 101 therein, these casings 112 are piled through outer and inner circumferential sealing packings 120 and 121 at the lowermost ends of the inclined partition plates 113 and lower surface of the step portions 117 so that the raw liquid and the filtrate are not absolutely mixed. The lowermost accommodating casing 112 is integrally formed with a retainer cover 123 having apertures 122 for exhausting the filtrate. The retainer cover 123 is formed with a positioning collar 125 into which a screw-threaded portion 124 of the fluid guide tube 111 at its lower end is inserted and a nut 126 is tightened on the screw-threaded portion 124 to complete the filter apparatus according to the invention.

With the filter apparatus 127 constructed as described above according to the invention, the raw liquid to be filtered flows along flowing passages shown by arrows in FIG. 8. In other words, the part of the raw liquid is supplied through an upper end of the apparatus into the uppermost doughnut type ceramic porous filter element 101 and the fluid guide tube 111 and into the raw liquid supply chamber 128 through the apertures 119 and the raw liquid supply opening 118. The filtrate which has been filtered through each the doughnut type ceramic porous filter element 101 once flows into the filtrate exhaust chambers 129 and is exhausted through the filtrate exhaust openings 116 out of the filter apparatus. Moreover, the filtrate which has been filtered through the lowermost ceramic porous filter element 101 is exhausted through the apertures 122 downward of the filter apparatus.

In the embodiment shown in FIG. 8, the liquid passages are set as shown by the arrows. Completely reverse liquid passages may be set in the same construction of the filter apparatus. In other words, it is possible to supply the raw liquid from the outer circumference into the filter apparatus 127 and exhaust the filtrate through the fluid guide tube 111 out of the apparatus.

FIG. 9 illustrates in longitudinal section a further embodiment of the filter apparatus using the doughnut type filter elements, which is suitable to be used in a case that filter apparatus 127 is not required to have a high strength. In this embodiment, like components are designated by the same reference numerals as those in the embodiment shown in FIG. 8 and will not be explained in further detail. Different from the embodiment shown in FIG. 8, the doughnut type ceramic porous filter elements 101 are fixed only at their inner circumferences and there are provided filtrate exhaust clearances 130 instead of the filtrate exhaust openings 116. In this embodiment, therefore, inner walls 131 of filter element casings 112 are formed integrally with step portions 117 having raw liquid passages and are fitted on a fluid guide tube 111, while the doughnut type ceramic porous filter elements 101 are fixed at their inner circumferences through inner circumferential sealing packings 121 and protective packings 115. Moreover, only the uppermost doughnut ceramic porous filter element 101 is fixed with the aid of a shoulder 132 provided at an upper end of the fluid guide tube 111, while a flat retainer cover 123 is used. In this embodiment, the raw liquid to be filtered flows along the passages shown by arrows in FIG. 9.

FIG. 10 schematically illustrates an actual filter unit 140 using the doughnut type filter elements according to the invention as shown in FIG. 10, the four filter apparatuses 127 are fixed to a unit cover 142 by means of unit retainer springs 141 and covered by a filter casing 143 to complete the filter unit 140. When a raw liquid is supplied into an inlet 144 of the filter unit 140, the filtrate is exhausted through an outlet 145 of the unit.

The inventors of this application measured and compared various performances of filter units shown in FIGS. 1, 4, 6 and 10 using the conventional sintered metal filters and the filter apparatuses shown in FIGS.

3, 5 and 8 using the five ceramic porous filter elements and the five doughnut type ceramic porous filter elements. Results are shown in Table 1.

Pores of a filter element are progressively clogged with particles during filtering so that the pressure difference between the entry and exit of the filter element becomes higher. The "maximum possible pressure difference" in Table 1 is the maximum value of the pressure difference at which the filtering operation is possible. If the pressure difference exceeds the maximum value, the filter element can no longer be used for filtering. The "actual maximum pressure difference" is the pressure difference at which the filter element is no longer used in an actual case, which is somewhat lower than the maximum possible pressure difference. The "specific filtering area" is a ratio of a filtering area $m^2$ of an filter element to a volume $m^3$ of the element. In the experiment, a liquid is used, which is similar in chemical and physical properties to the liquid contaminated by radioactivity in order to avoid a risk of radioactivity.

is inexpensive and of light weight in comparison with those using the sintered metal filters of the prior art. Therefore, the filter unit incorporating therein the filter apparatuses according to the invention is also inexpensive and of light weight and is useful particularly for purifying the water contaminated by radioactivity in nuclear power plants.

What is claimed is:

1. A filter for purifying raw liquid waste, comprising:
   a filter unit casing having an inlet opening portion and an outlet opening portion, said inlet opening portion being isolated from direct communication with said outlet opening portion;
   a plurality of columnar shaped filter apparatuses positioned in said filter unit casing in a parallel, radially spaced arrangement, said plurality of filter apparatus including a plurality of coaxially arranged filter element casings;
   a ceramic porous filter element encased in each filter element casing to form a plurality of ceramic po-

TABLE 1

|  |  | Prior art Sintered metal filter FIG. 1 | Present invention | | |
|---|---|---|---|---|---|
|  |  | | Five ceramic porous filter elements | | Five doughnut type ceramic porous filter elements |
|  |  | | FIG. 4 | FIG. 6 | FIG. 10 |
| Used condition | Treated flow rate | 25 $m^3$/h | 25 $m^3$/h | 25 $m^3$/h | 25 $m^3$/h |
|  | Maximum possible pressure difference | 4.5 kg/$cm^2$ | 4.5 kg/$cm^2$ | 4.5 kg/$cm^2$ | 4.5 kg/$cm^2$ |
|  | Actual maximum pressure difference | 3.5 kg/$cm^2$ | 3.5 kg/$cm^2$ | 3.5 kg/$cm^2$ | 3.5 kg/$cm^2$ |
| Filter element | Material | boron carbon particles(bronze) | cordierite | cordierite | cordierite |
|  | Thickness | 9 mm (7.5 mm + 1.5 mm) | 0.3 mm | 0.3 mm | 0.3 mm |
|  | Porosity | 18% | 50% | 50% | 50% |
|  | Diameter of pores | 2 $\mu$m | 6 $\mu$m | 6 $\mu$m | 6 $\mu$m |
|  | Dimension | about 200 Φ × 50 Φ × 9 t (hollow) | 5.66 D × 6 L | 5.66 D × 6 L | 7.87 × 2.56 D × 6 L |
|  | Filtering area | 0.0585 $m^2$ (calculated estimated values) | 2.3 $m^2$ | 2.3 $m^2$ | 3.9 $m^2$ |
|  | Specific filtering area | about 220 $m^2/m^3$ | 930 $m^2/m^3$ | 930 $m^2/m^3$ | 930 $m^2/m^3$ |
| Filter apparatus | Number of filter elements | 94 (47 × two stages) | 5 | 5 | 5 |
|  | Filtering area | 5.5 $m^2$ | 11.5 $m^2$ | 11.5 $m^2$ | 19.5 $m^2$ |
|  | Collected amount | 3,850 g | 8,050 g | 8,050 g | 13,650 g |
| Filter unit | Number of filter apparatuses | 4 | 4 | 4 | 4 |
|  | Weight | 120 kg/unit | 55 kg | 55 kg | 56 kg |
|  | Total filtering area | 22 $m^2$ | 46 $m^2$ | 46 $m^2$ | 78 $m^2$ |

As can be seen from the Table 1, the ceramic porous filter elements according to the invention have wider filtering areas in comparison with those of sintered metal filters hitherto used. The filter units including the four filter apparatuses having the ceramic porous filter elements are of light weight and have wide total filtering areas to greatly improve the filtering performance. The life span of the filter units according to the invention until arriving at the actual maximum pressure difference 3.5 kg/$cm^2$ is longer than that of the prior art.

It will be understood by those skilled in the art that the invention is not limited to the above embodiments and that various changes and modifications may be made in the invention without departing from the spirit and scope thereof. For example, the front and rear ends of the ceramic porous filter elements are regularly alternately sealed in a manner different from those shown in the drawings.

As can be seen from the above detailed explanation, as the filter apparatus includes a plurality of ceramic filter elements in multiple stages according to the invention, it has wider filtering areas and longer life span and rous filter elements arranged in an axially spaced relationship, said ceramic porous filter elements each having a front end in communication with said inlet opening portion, a rear end in communication with said outlet opening portion, and a plurality of longitudinal passage ways extending in a direction substantially parallel to the axis of said plurality of filter element casings and connecting said front end to said rear end, said passageways being alternately opened and closed at said front end and said rear end, such that substantially all of those passageways open at said front end are closed at said rear end;
raw liquid supply means defining an opening for transporting raw liquid waste to be filtered, from said inlet opening to raw liquid supply chambers defined by said ceramic porous filter elements and located adjacent the front ends of said ceramic porous filter elements; and
filtrate exhaust means defining an opening for transporting filtrate which has passed through the filter elements, from filtrate exhaust chambers defined by said ceramic porous filter elements and located adjacent the rear ends of said ceramic porous filter elements, to said outlet opening.

2. A filter according to claim 1, wherein each of said plurality of columnar shaped filter apparatuses includes a double cylinder casing wherein said plurality of coaxially arranged filter element casings are positioned, said double cylinder casings including an inner cylinder adjacent said plurality of filter element casings and an outer cylinder radially spaced from said inner cylinder to define a longitudinal annular space therebetween, said longitudinal annular space being longitudinally divided into a raw liquid passage and a filtrate passage, said raw liquid passage being in communication with said raw liquid supply chambers through raw liquid supply openings formed in said inner cylinder, said filtrate passage being in communication with said filtrate exhaust chambers through filtrate exhaust openings formed in said inner cylinder, said raw liquid supply means including said raw liquid passage and said raw liquid supply openings, and said filtrate exhaust means including said filtrate passage and said filtrate exhaust openings.

3. A filter according to claim 2, further comprising spacer members interposed between adjacent filter element casings, said spacer members including raw liquid supply openings therein for transporting the raw liquid waste from the raw liquid supply openings formed in said inner cylinder to the raw liquid supply chambers, and filtrate exhaust openings in said spacer members for transporting the filtrate from the filtrate exhaust chambers to the filtrate exhaust openings formed in said inner cylinder.

4. A filter according to claim 3, wherein said spacer members define sidewalls of said raw liquid supply chambers.

5. A filter according to claim 3, wherein each filter element casing has a stepped portion formed at a location adjacent the rear end of each ceramic porous filter element, such that said stepped portion defines sidewalls of said filtrate exhaust chambers.

6. A filter according to claim 3, further comprising elastic members interposed between the spacer members which include the raw liquid supply openings and the ceramic porous filter elements, and protective packing layers interposed between the spacer members which include the filtrate exhaust openings and the ceramic porous filter elements.

7. A filter according to claim 1, wherein said raw liquid supply chambers are defined by alternate adjacent pairs of ceramic porous filter elements and said filtrate exhaust chambers are defined by the remaining alternate adjacent pairs of ceramic porous filter elements.

8. A filter according to claim 1, wherein each ceramic porous filter element has an annular cross-sectional shape and a coaxially arranged center aperture, and said filter further comprises a raw fluid guide tube passing through the center apertures of each ceramic porous filter element, and each filter element casing includes an inclined partition plate dividing a space defined between adjacent ceramic porous filter elements into a raw liquid supply chamber adjacent the front end of one of the adjacent ceramic porous filter elements and a filtrate exhaust chamber adjacent the rear end of the other adjacent ceramic porous filter elements, said fluid guide tube having raw liquid supply openings formed therein and in communication with the raw liquid supply chambers, said raw liquid supply means including said raw fluid guide tube, said raw liquid supply openings and said raw liquid supply chambers.

9. A filter according to claim 8, wherein said filter element casings include filtrate exhaust openings in communication with said filtrate exhaust chambers, said filtrate exhaust means including said filtrate exhaust chambers and said filtrate exhaust openings.

10. A filter according to claim 8, wherein said filtrate exhaust chambers are in direct communication with an exterior of the filter apparatus, such that said filtrate exhaust means include a portion of said filtrate exhaust chambers.

* * * * *